D. S. HARNER.
PORTABLE FENCE.
No. 175,083. Patented March 21, 1876.
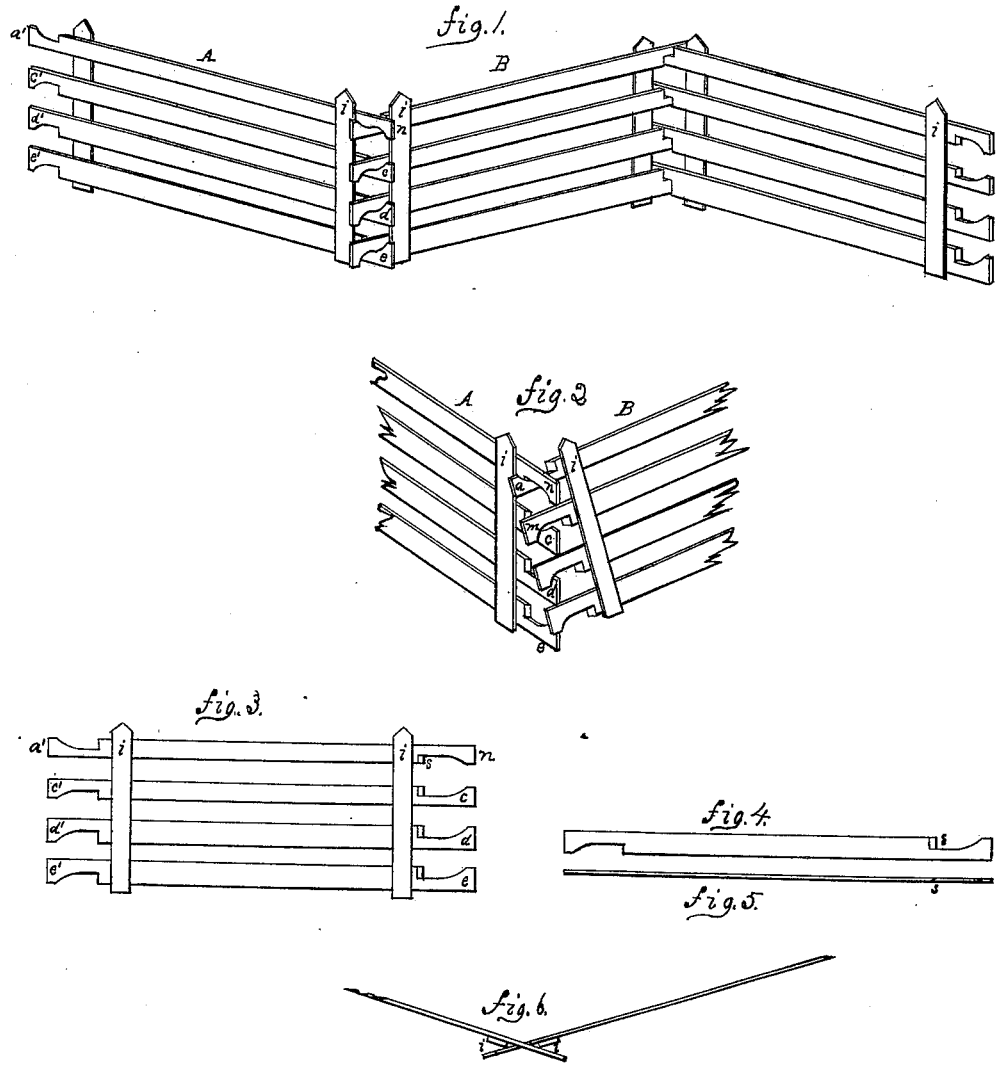

UNITED STATES PATENT OFFICE.

DAVID S. HARNER, OF XENIA, OHIO.

IMPROVEMENT IN PORTABLE FENCES.

Specification forming part of Letters Patent No. 175,083, dated March 21, 1876; application filed August 9, 1875.

*To all whom it may concern:*

Be it known that I, DAVID S. HARNER, of Xenia, Greene county, Ohio, have invented an Improvement in Portable Fences, of which the following is a specification:

The object of my invention is to construct a cheap, durable, and efficient portable fence, which dispenses with the use of metallic hooks, staples, &c., for the purpose of holding the panels together.

In the accompanying drawings similar letters of reference indicate corresponding parts.

Figure 3 represents a panel as it stands on the ground. It is constructed by taking lumber of the required dimensions to suit size of panels, every board being shaped into a rounded hook at each end on opposite edges, as shown in Fig. 4, the shoulder of the hook being beveled, as shown in Figs. 4 and 5 at S.

After having prepared a number of boards like the one shown in Fig. 4, and the requisite number of upright pieces $i$, a solid floor is selected upon which to construct the panels, which is done by nailing the boards 1, 2, 3, and 4 to the uprights, with three hooks, $c\ d\ e$, turned up and three on the opposite end, $c'\ d'\ e'$, turned down, the hooks $a\ n$ on each end of the top board being placed contrary to the ones on the lower boards, as shown in Fig. 3.

The manner of interlocking the panels is as follows: The first panel A, Figs. 1 and 2, is placed in an upright position with the arrangement of hooks at the ends of the panels, as shown, to the right; the panel B is placed at a right angle to A, and the two hooks $a\ m$ placed between hooks $n$ and $c$, as shown in Fig. 2.

The hooks $c\ d\ e$ on panel A are cut out sufficiently to allow panel B to swing into position, as shown in Fig. 1; the panel is then extended lengthwise of the fence and made to form a very obtuse angle, as shown in Fig. 6, top view, thereby giving the requisite amount of worm, and firmly securing the panels at their extremities by the interlocking of the hooks and their contact with the upright pieces $i$.

It is obvious, by the addition of panels, the fence can be extended to any length, and, if required for sheep or cattle pens, it can be made to inclose a piece of ground of almost any shape or inclination.

I do not claim as my invention the use of panels with hooked or notched extremities in a general way, as that is old; but,

I claim—

The panels A B, having rails extended beyond the uprights $i$, and concaved and beveled, as shown and described, for the purpose of interlocking, as set forth.

DAVID S. HARNER.

Witnesses:
R. PARTINGTON,
HARVEY T. FERGUSON.